US012338923B2

(12) United States Patent
Rutkowski

(10) Patent No.: US 12,338,923 B2
(45) Date of Patent: Jun. 24, 2025

(54) DATA CABLE RETAINING POST

(71) Applicant: Joseph Rutkowski, Yardley, PA (US)

(72) Inventor: Joseph Rutkowski, Yardley, PA (US)

( * ) Notice: Subject to any disclaimer, the term of this patent is extended or adjusted under 35 U.S.C. 154(b) by 0 days.

(21) Appl. No.: 18/510,824

(22) Filed: Nov. 16, 2023

(65) Prior Publication Data

US 2024/0344636 A1    Oct. 17, 2024

Related U.S. Application Data

(60) Provisional application No. 63/496,098, filed on Apr. 14, 2023.

(51) Int. Cl.
*F16L 3/04* (2006.01)
*F16L 3/06* (2006.01)
*H02G 3/04* (2006.01)

(52) U.S. Cl.
CPC .............. *F16L 3/04* (2013.01); *F16L 3/06* (2013.01); *H02G 3/0456* (2013.01)

(58) Field of Classification Search
CPC ............ F16L 3/04; F16L 3/06; H02G 3/0456
See application file for complete search history.

(56) References Cited

U.S. PATENT DOCUMENTS

| | | | | |
|---|---|---|---|---|
| 2,564,517 A | * | 8/1951 | Beals .................. | G09F 3/20 40/658 |
| 3,521,843 A | * | 7/1970 | Ogle .................. | F16L 3/26 248/68.1 |
| 5,893,539 A | * | 4/1999 | Tran .................. | H02G 3/0443 248/68.1 |
| 6,378,811 B1 | | 4/2002 | Potter et al. | |
| 6,483,026 B1 | * | 11/2002 | Snider, Jr. ............. | H02G 3/32 174/496 |
| 7,520,476 B2 | * | 4/2009 | Caveney .............. | H02G 3/0456 248/59 |
| 9,587,433 B2 | | 3/2017 | Sylvester et al. | |
| 10,407,985 B2 | | 9/2019 | Sylvester et al. | |

(Continued)

OTHER PUBLICATIONS

ICC ladder cable retaining kit 2018 product page for part No. ICCMSLRCRP, https://cdn.adiglobaldistribution.us/pim/Original/10059/ICCMSLRCRP_Product_Data_Sheet.pdf (Year: 2018).*

(Continued)

*Primary Examiner* — Eret C McNichols
*Assistant Examiner* — Ding Y Tan
(74) *Attorney, Agent, or Firm* — Charney IP Law LLC

(57) ABSTRACT

Presented is a data cable retaining post for retaining data cable laid along a ladder rack having a pair of longitudinal main supports, a first of the longitudinal main supports having an upper surface and a lower surface. The data cable retaining post includes a front plate and a connection member, the connection member having a lower portion forming a hook, a mid-portion forming a locking member, and an upper portion. When installed on the first of the longitudinal main supports of ladder rack, the lower portion of the connection member is adapted to be positioned with the hook surrounding the lower surface of the longitudinal main support and the mid-portion is adapted to be positioned adjacent the upper surface of the longitudinal main support such that the locking member locks the data cable retaining post to the longitudinal main support.

18 Claims, 16 Drawing Sheets

(56) References Cited

U.S. PATENT DOCUMENTS

| | | | |
|---|---|---|---|
| 10,566,774 B1* | 2/2020 | Krietzman | H02G 3/04 |
| 10,903,633 B2 | 1/2021 | Brouwer et al. | |
| 11,381,065 B2* | 7/2022 | McAdoo | H02G 1/00 |
| 12,027,838 B2* | 7/2024 | Thompson | F16L 3/06 |
| 2008/0116152 A1 | 5/2008 | Datri et al. | |
| 2008/0264688 A1* | 10/2008 | Chopp | H02G 3/263 |
| | | | 174/503 |
| 2021/0262588 A1 | 8/2021 | Kruzel et al. | |
| 2021/0282294 A1 | 9/2021 | Anderson | |
| 2022/0037866 A1 | 2/2022 | Morrow | |
| 2024/0133420 A1* | 4/2024 | Ovadia | F16B 45/008 |

OTHER PUBLICATIONS

ICC ladder rack cable retainer kit youtube video dated Jun. 27, 2018 for part No. ICCMSLRCRP, https://www.youtube.com/watch?v=Vb1_MUaCyJ4 (Year: 2018).*

Chase Plastics online page titled "Metal-to-Plastic Conversion" dated by web.archive.org at Oct. 28, 2022 https://chaseplastics.com/chase-the-knowledge/metal-to-plastic-conversion/ (Year: 2022).*

DataComm B-Line series Redi-Rail™ from Eaton runway ladder with removable rungs product sheets dated Feb. 2017, https://assets.usesi.com/product-media/brochures/270283_brochure.pdf(Year: 2017).*

Chatsworth products cable retaining post online product page dated by web.archive.org to Dec. 8, 2022, https://www.chatsworth.com/en-us/products/cable-pathway/cable-runway/bends-drops-and-dividers/cable-retaining-post (Year: 2022).*

Hoffman Enclosures nVent cable runway ladder rack system catalog dated 2021, https://www.nvent.com/sites/default/files/acquiadam_assets/2021-05/89205377.pdf (Year: 2021).*

Black box ladder racks and accessories catalog # 20314 published on Jul. 21, 2010 (Year: 2010).*

ICC Ladder Rack Cable Retainer Kit in 10-Pack, https://icc.com/product/ladder-rack-cable-retainer-kit-10-pack/, printed Mar. 30, 2023.

CPI—cable retaining post, https://www.cdw.com/product/cpi-cable-retaining-post/363718, printed Mar. 30, 2023.

Chatsworth Products Cable Retaining Post, https://www.chatsworth.com/en-us/products/cable-pathway/cable-runw, printed Mar. 30, 2023.

* cited by examiner

DATA CABLE RETAINING POST

BACKGROUND OF THE INVENTION

The present invention relates to systems and methods for retaining data cable installed along cable ladder racks in data centers and other business enterprises.

It is well known that data cables, such as coaxial cable, fiber optic cable, and twisted pair cable are run throughout buildings and other structures using ladder rack systems. Such systems generally comprise a horizontal base upon which the cables lie and vertical retaining posts for securing the cables on top of the horizontal base. Colloquially, the horizontal base is often referred to as a "ladder" because it resembles one in appearance, if not function. Thus, the systems are referred to as ladder rack systems.

Conventional vertical support posts for ladder rack systems, such as those shown in FIG. 1, are manufactured from metal. These systems include the ladder A having a pair of longitudinal main supports B, also referred to as stringers, with lateral minor supports C spanning the longitudinal main supports at predetermined intervals (only one lateral minor support being shown here). Vertical retaining posts D are mounted, typically in opposed pairs, periodically along the longitudinal main support B to retain cables laid on the lateral minor supports B within the confines of ladder A.

SUMMARY OF THE INVENTION

Although well received and ubiquitous in the data cable industry, the conventional vertical support posts are not optimized for efficiency in installation, cost, or weight. Traditionally, such vertical support posts comprise multiple metal pieces that must be assembled in the field. For example, often these include a vertical support E, a bracket F, nut and bolt combination G, and a plastic cap H. Assembling these vertical support posts and installing them on ladder rack systems is a time consuming and inefficient process. Moreover, the small nuts and bolts E of the conventional vertical support posts may be lost during installation, which then requires replacement.

It would therefore be beneficial to provide a data cable retaining post that eliminates these issues. The data cable retaining posts of the present invention are designed to prevent the deficiencies of conventional data cable retaining posts, and are summarized generally below.

In one embodiment of the present invention, referred to herein as Embodiment A, a data cable retaining post for retaining data cable laid along a ladder rack having a pair of longitudinal main supports, a first of the longitudinal main supports having an upper surface and a lower surface, said data cable retaining post is provided. In this embodiment, the data cable retaining post includes a front plate and a connection member, the connection member having a lower portion forming a hook, a mid-portion forming a locking member, and an upper portion. When installed on the first of the longitudinal main supports of a ladder rack, the lower portion of the connection member is adapted to be positioned with the hook surrounding the lower surface of the longitudinal main support and the mid-portion is adapted to be positioned adjacent the upper surface of the longitudinal main support such that the locking member locks the data cable retaining post to the longitudinal main support, the data cable retaining post thereby confining data cable laid along the ladder rack between the mid-portion and the upper portion.

In Embodiment A, the lower portion of the connection member may comprise a shoulder having a vertical edge opposed to a rear surface of the connection member to form a void therebetween If so, the void may include a rounded edge along a portion of the rear surface of the connection member.

Separately, in Embodiment A, the locking member may comprise a stem and a triangular cam, the stem extending from a rear surface of the connection member.

If so, the triangular cam may include a cam shoulder forming a ramp extending to a tip of the triangular cam, the ramp forming a hypotenuse of the triangular cam.

In any embodiment of the invention, the stem may be resilient.

In any embodiment of the invention, the connection member may taper smaller from the locking member to the upper portion.

In Embodiment A, the locking member may comprise a stem and a triangular cam, wherein the triangular cam includes a cam shoulder forming a ramp extending from the cam shoulder to a tip, the ramp forming a hypotenuse of the triangular cam.

In such case the stem may be resilient.

In Embodiment A, the connection member may be formed from ribs.

If so, the connection member may include gussets between the ribs.

In a further Embodiment of the present invention, identified as Embodiment B, a data cable retaining post may comprise a front surface and a rear surface, a lower portion forming a hook, a mid-portion forming a locking member extending from the rear surface, and an upper portion, the hook defining a shoulder having a vertical edge opposite the rear surface, and the locking member formed from a stem and a ramped cam.

In Embodiment B, the rear surface may define a rounded void opposite the vertical edge of the shoulder.

If so, the stem may be resilient.

If so, the rear surface may taper toward the front surface from the mid-portion to the upper portion.

Again if so, the data cable retaining post may include ribs between the front surface and the rear surface.

If provided with ribs, the data cable retaining post may further comprise gussets between the ribs.

Such a data cable retaining post may further comprise a front plate defining the front surface.

In a third embodiment of the present invention, a method of installing a data cable retaining post on a longitudinal main support of a ladder rack, wherein the data cable retaining post includes a front surface and a rear surface, a lower portion forming a hook with a void, and a mid-portion forming a locking member with a stem extending from the rear surface, is provided. The method may include the steps of hooking the hook on a bottom portion of the longitudinal main support such that the bottom portion is situated in the void, rotating the data cable retaining post such that the hook catches on the bottom portion of the longitudinal main support and the locking member contacts an upper portion of the longitudinal main support, continuing to rotate the data cable retaining post to bend the stem, and continuing to rotate the data cable retaining post until the locking member locks on the longitudinal main support.

The described method may further include the step of manually bending the stem separate from the step of continuing to rotate the data cable retaining post.

BRIEF DESCRIPTION OF DRAWINGS

The subject matter regarded as the invention is particularly pointed out and distinctly claimed in the concluding portion of the specification. The invention, however, both as to organization and method of operation, together with features, objects, and advantages thereof, will be or become apparent to one with skill in the art upon reference to the following detailed description when read with the accompanying drawings. It is intended that any additional organizations, methods of operation, features, objects or advantages ascertained by one skilled in the art be included within this description, be within the scope of the present invention, and be protected by the accompanying claims.

Note that while various methods may be provided with steps in particular orders, those orders are not to be considered the only order in which the various methods may be conducted and same may be conducted in any practical order With respect to the drawings.

DETAILED DESCRIPTION OF THE INVENTION

Figure 1:
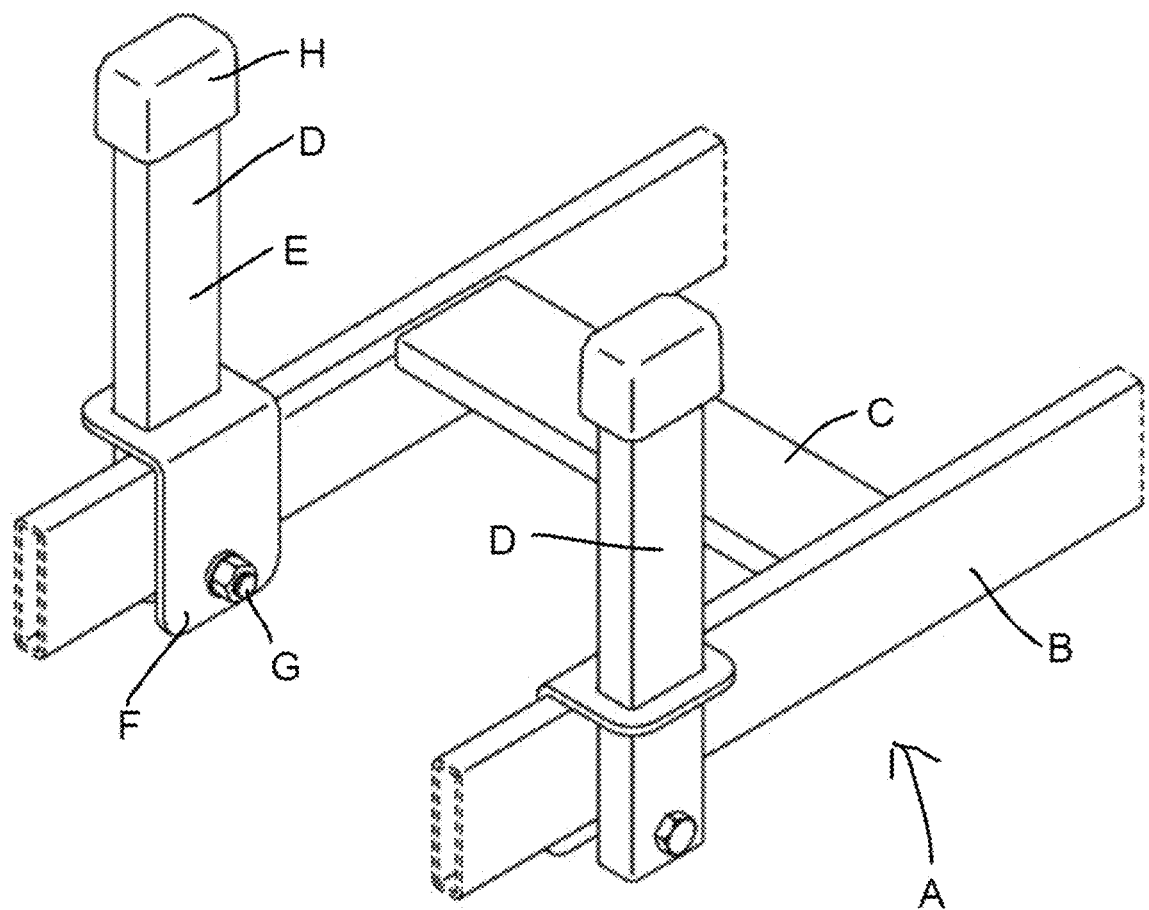
FIG. 1 is a frontal perspective view of a prior art data cable retaining post

In the following are described the preferred embodiments of the data cable retaining post in accordance with the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

Figure 2:
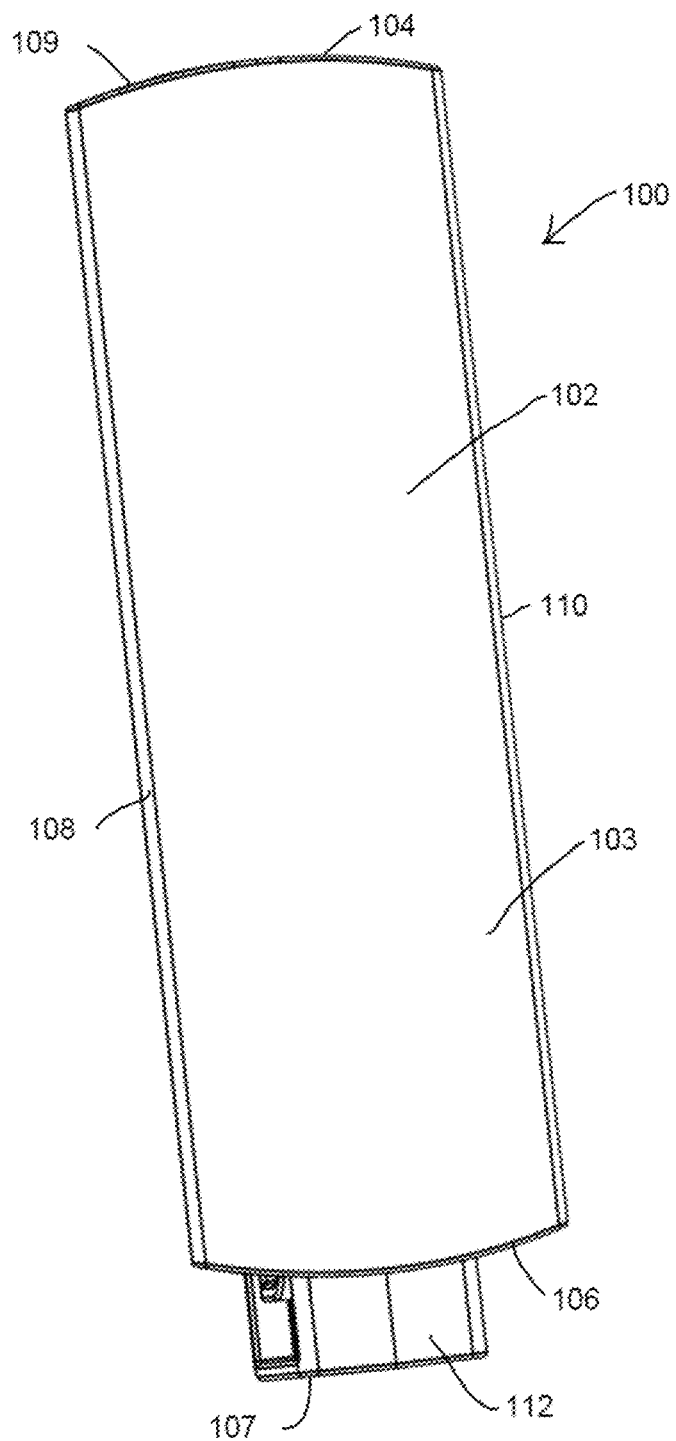
FIG. 2 is a front perspective of a data cable retaining post in accordance with a first embodiment of the present invention.

As shown in FIG. 2, in a first embodiment of the preset invention, a data cable retaining post 100 may include a generally rectangular front plate 102 having a top 104 and bottom 106 with first side 108 and second side 110 extending therebetween. The front plate 102 may include a front surface 103 which is bowed, or convex, as shown more particularly in FIG. 3. The front surface 103 in other embodiments may be flat or concave.

In addition to the front plate 102, the data cable retaining post 100 may also include a connection member 112 which extends along a rear surface 105 (FIG. 3) of the data cable retaining post 100 and below the bottom 106 of the front plate 102.

Figure 3:
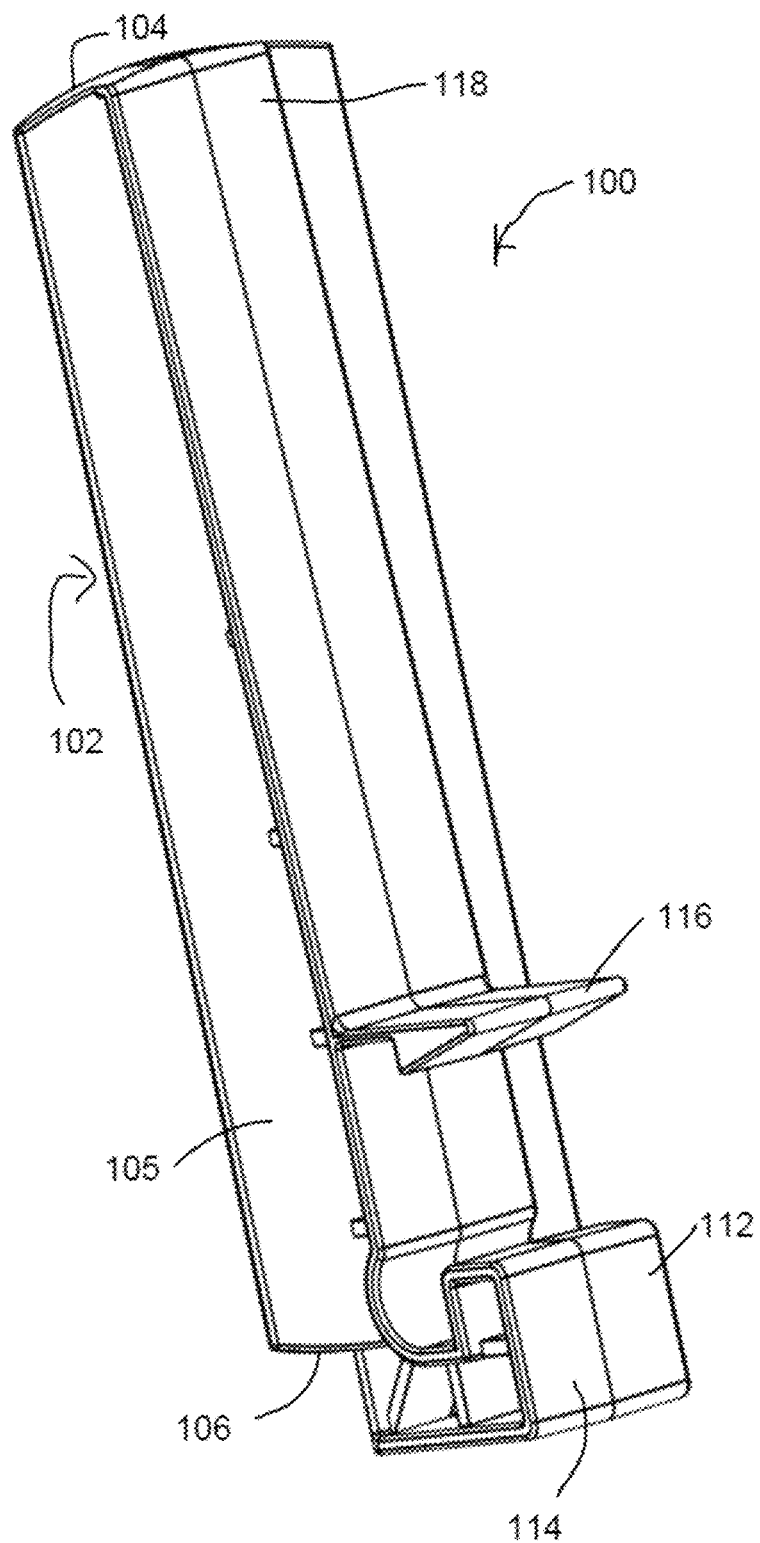
FIG. 3 is rear perspective of the data cable retaining post of FIG. 1.

Moving to FIG. 3, it is shown that the connection member 112 includes a lower portion 114 toward the 106 bottom of the front plate 102, a mid-portion 116, and an upper portion 118 toward the top 104 of the front plate 102. As will be discussed, the lower portion 114 and mid-portion 116 are used to clamp to a ladder rack while the upper portion 118 is available for further structural support of the front plate 102.

Figure 8:
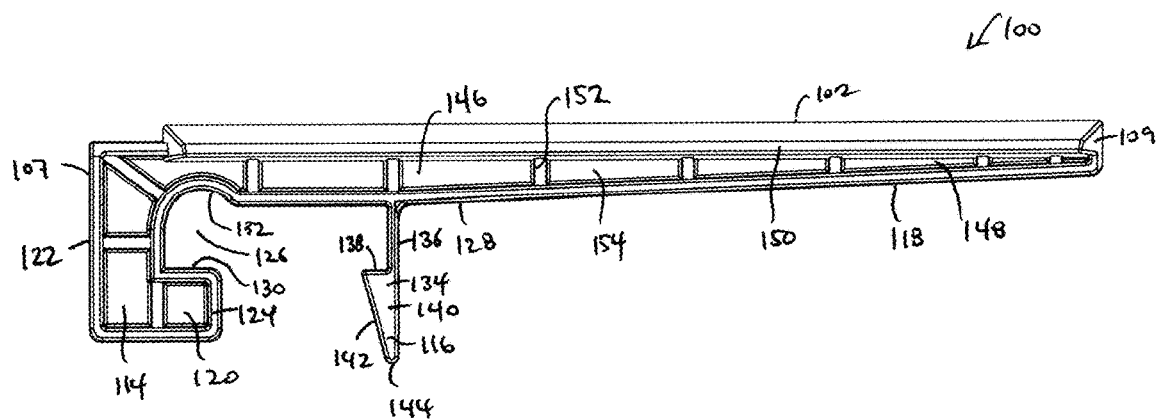
FIG. 8 is a right side view of the data cable retaining post of FIG. 1.

The lower portion 114 is best described with relation to FIG. 8. As shown, the lower portion 114 includes a hook member 120 formed from a base 122 at the extreme bottom 107 of the data cable retaining post 100 and an upturned shoulder 124 toward the mid-portion 116 of the connection member 112. The shoulder 124 forms a void 126 between itself and the rear surface 128 of the connection member 112, the void being bound by a vertical edge 130 of the shoulder and a rounded edge 132 of the rear surface. It will be appreciated that the distance between the vertical edge 130 and rounded edge 132 is approximately equal to, or just slightly larger than, the thickness of a ladder rack support for installation of the data cable retaining post 100 on the ladder rack, as will be shown and described.

Between the lower portion 114 of the connection member 112 and the upper portion 118 thereof lies the mid-portion 116. At the mid-portion 116 there is found a locking member 134. The locking member 134 is formed from a stem 136 which extends from the rear surface 128 of the connection member 112 toward a shoulder 138 of a cam 140, the shoulder being essentially perpendicular to the stem, and the shoulder 138 forming a base of the cam 140. The cam 140 is generally triangular and is formed from the shoulder 138 on one leg, a ramp 142 on the hypotenuse, and an extension of the stem 136 on the other leg. The extension of the stem 136 and the ramp 142 meet at the tip 144 of the locking member 134, opposite the shoulder 138. It will be appreciated that the locking member 134 serves—in conjunction with the hook member 120—to secure the data cable retaining post 100 on the ladder rack, as will be shown and described.

Moving toward the extreme top 109 of the data cable retaining post 100 the connection member 112 tapers from a deep section 146 near the mid-portion 116 toward a narrow section 148 toward the extreme top 109, the tapering being measured as a distance between the rear surface 128 of the connection member 112 and the rear surface 105 of the front plate 102.

Figure 4:
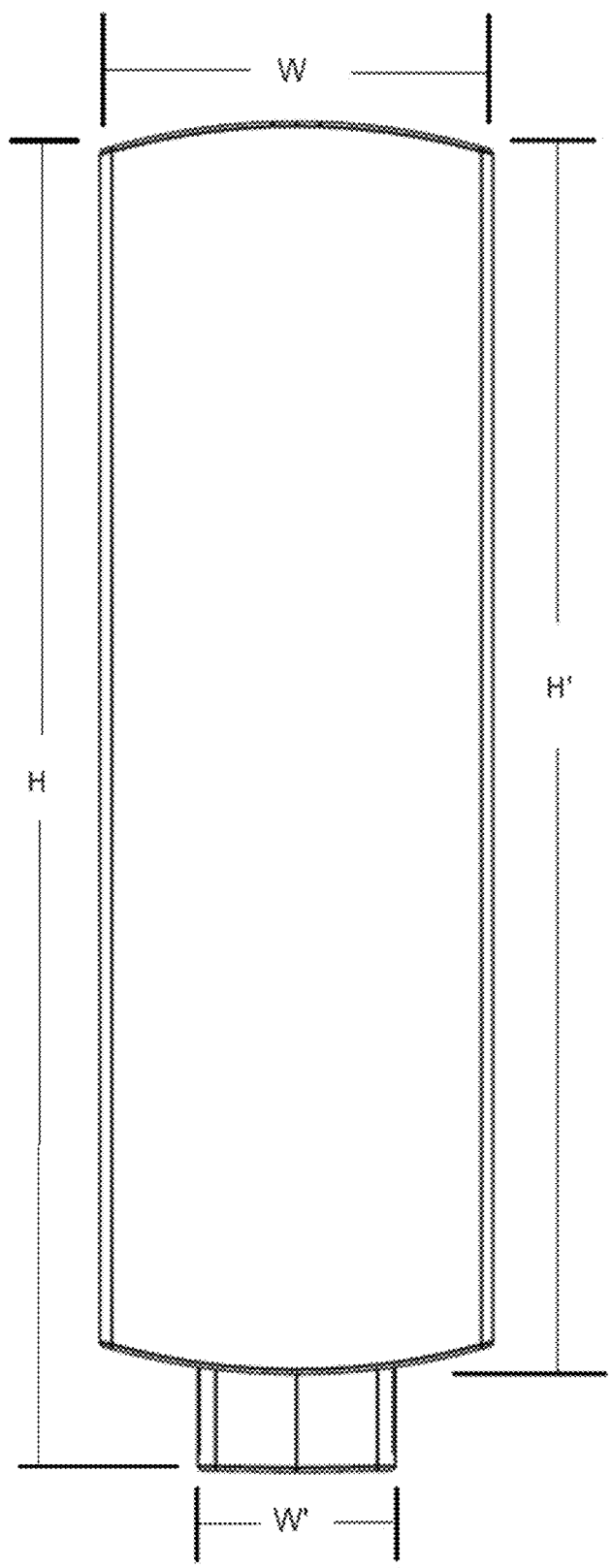
FIG. 4 is a frontal view of the data cable retaining post of FIG. 1.
Figure 5:
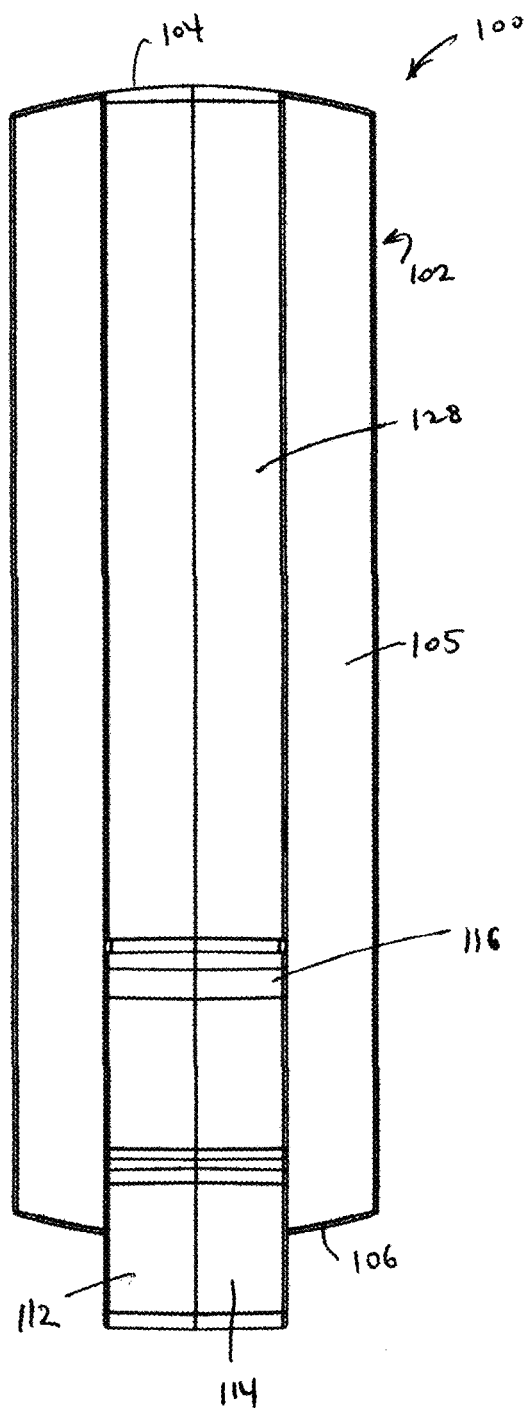
FIG. 5 is rear view of the data cable retaining post of FIG. 1.
Figure 6:
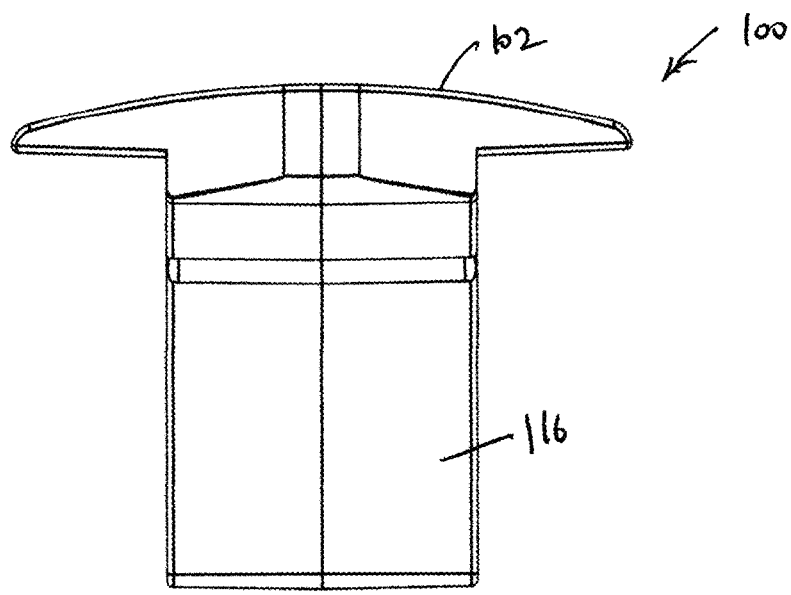
FIG. 6 is a top view of the data cable retaining post of FIG. 1.
Figure 7:
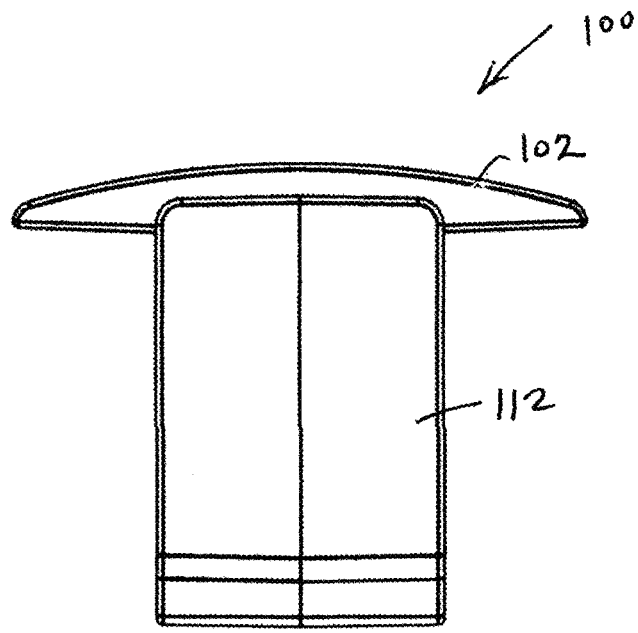
FIG. 7 is a bottom view of the data cable retaining post of FIG. 1.

Moving back to FIG. 3, and with reference to FIGS. 4 and 5, it will be appreciated that the front plate 102 includes a width W while the connection member 112 includes a width W', W' being smaller than W. The width W may be generally between 1 inch and 3 inches with 2 inches being preferred. The width W' may be generally between 0.75 inches and 1.5 inches with 1 inch being preferred.

The front plate 102 also includes a height H', the height H' generally being between 5 inches and 8 inches with 6.5 inches being preferred. An overall height of the data cable retaining post 100, shown as H, is generally between 6 inches and 9 inches with 7 inches being preferred.

Figure 9:
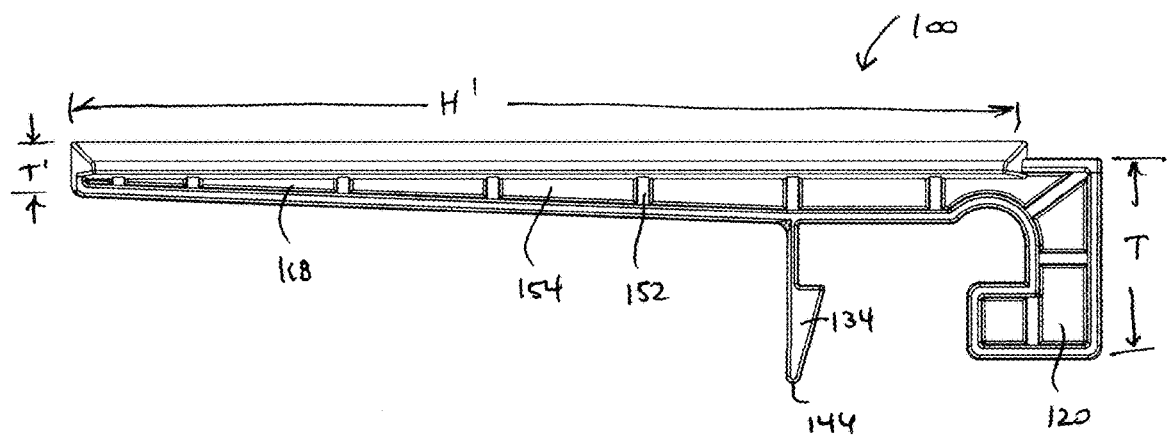
FIG. 9 is a left side view of the data cable retaining post of FIG. 1.

The longitudinal main support B of conventional ladder rack A typically has dimensions of 1.5 inches tall by 0.375 inches wide. As such, the data cable retaining post, and particularly the hook member 120, the locking member 134, and the space between the hook member and the locking member must accommodate these dimensions. For conventional ladder rack A, thickness T of the data cable retaining post 100 at the extreme bottom 107 of the data cable retaining post 100, shown in FIG. 9, must be between approximately 1 inch and 1.5 inches to accommodate a reasonably sized shoulder 124, with a preferred dimension of approximately 1.25 inches. A smaller thickness T' at the extreme top 109 of the data cable retaining post 100 may generally be between 0.125 inches and 0.375 inches with 0.25 inches being preferred. As shown in FIG. 9, these thicknesses are measured between the rear surface 128 of the connection member 112 and the rear surface 150 of the front plate 102.

Figure 17:
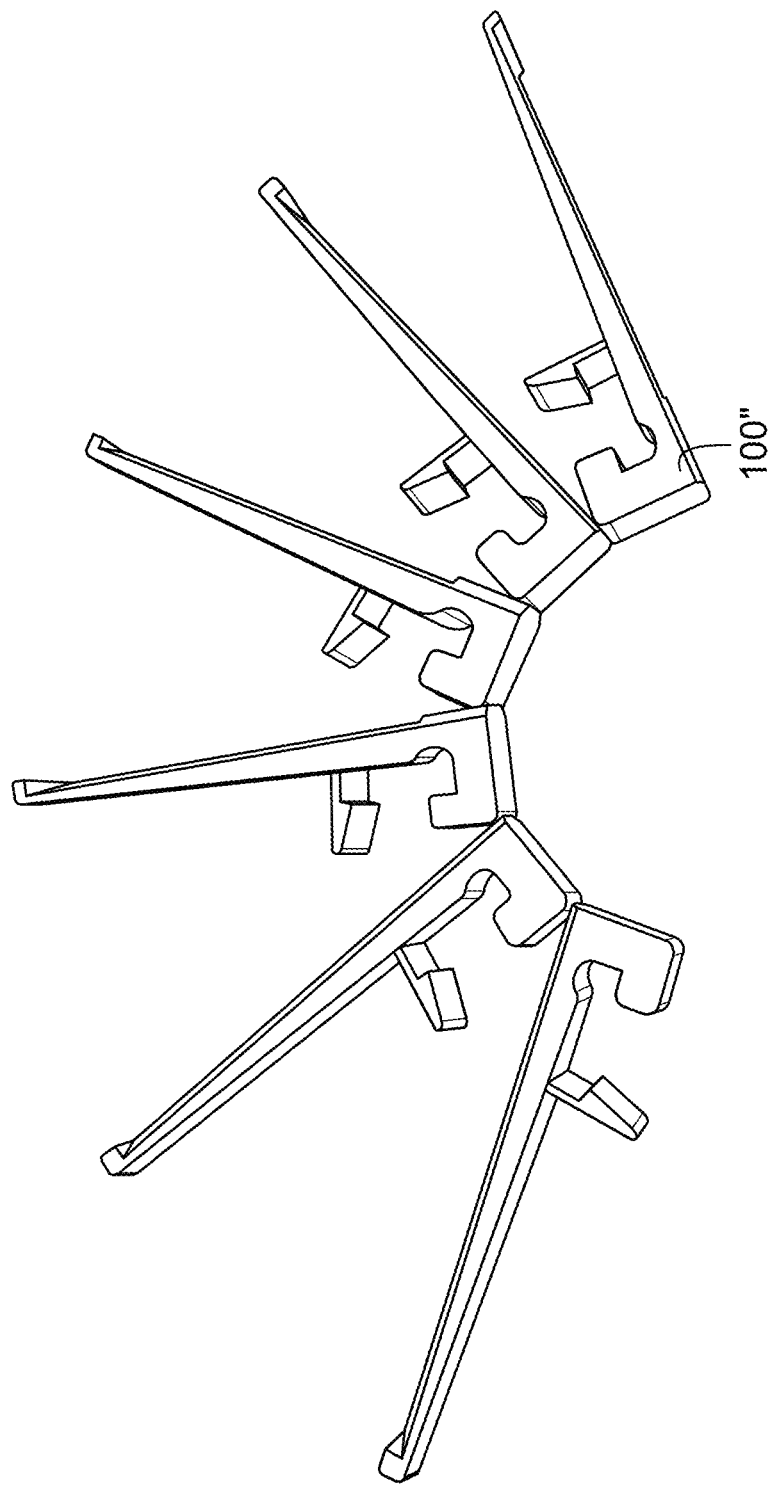
FIG. 17 depicts a series of data cable retaining posts in accordance with another embodiment of the invention; and, FIG. 18 depicts a series of data cable retaining posts in accordance with another embodiment of the invention.
Figure 18:
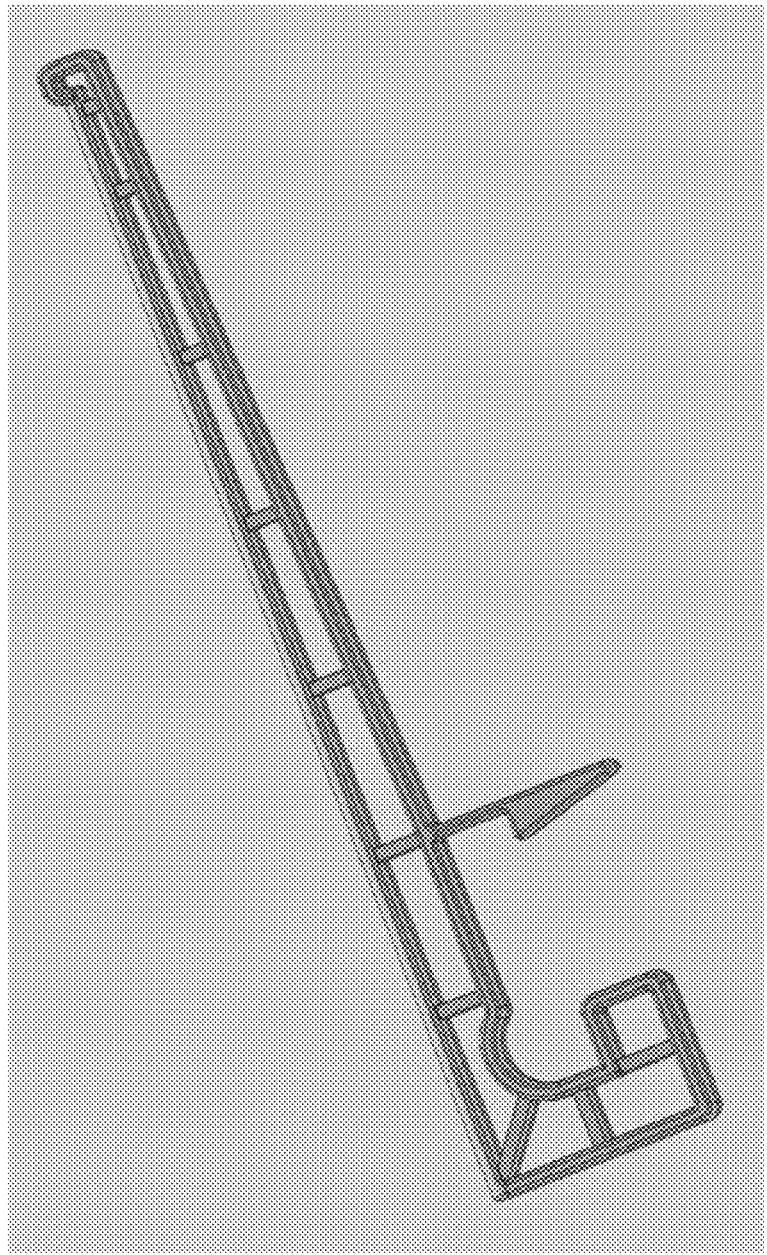

Referring still to FIG. 9, it will be appreciated that the connection member 112, in this embodiment, comprises an open web. That it, the connection member 112 is manufactured with ribs 152 and gussets 154, the gussets being plates filling the spaces between the ribs. This provides the data cable retaining post 100 with excellent structural rigidity to function while also decreasing weight and material costs from data cable retaining posts that are solid (see FIG. 17). As will be discussed, the gussets 154 may also be replaced with voids (see FIG. 18), such that the connection member 112 essentially defines an open truss. This even further reduces weight and material costs. In designing the data cable retaining post 100, one must balance the weight and material costs against any reduced strength that might be revealed from an open truss arrangement such as shown in FIG. 18.

Regarding materials, the data cable retaining post 100 is preferably manufactured from plastic/polymer materials, such as Acrylonitrile Butadiene Styrene ("ABS"), Nylon, carbon fiber filled Nylon, Acetal ("polyoxymethylene" or "POM"), Polyvinyl chloride, or others. Key considerations in material selection include light weight, high strength, high stiffness, low material costs, and ease of manufacturing. It is also beneficial that the material be non-conductive and have excellent wear properties. Accordingly, other materials not specifically listed, or to be invented/commercialized, may be used.

It will be appreciated that in other embodiments, the data cable retaining posts may not include a front plate 102 per se. Instead, a front surface of the connection member may serve as the front plate. An example of such a data cable retaining post 100' is shown in FIGS. 10-16, which are used below to describe exemplary methods of installing the data cable retaining posts on a ladder rack A. While this front plate-less data cable retaining post is an option, it is preferred that the data cable retaining post include a front plate as this permits the data cable retaining post to be wider at the point of contact with the cables, and helps to prevent the cables from binding or being tied up on the narrower data cable retaining post embodiments. In embodiments without a separate front plate, the connection member 112 may include a front surface, opposite to the rear surface (e.g. rear surface 128), which is wider than the rear surface and therefore acts functionally as the front plate.

Figure 10:
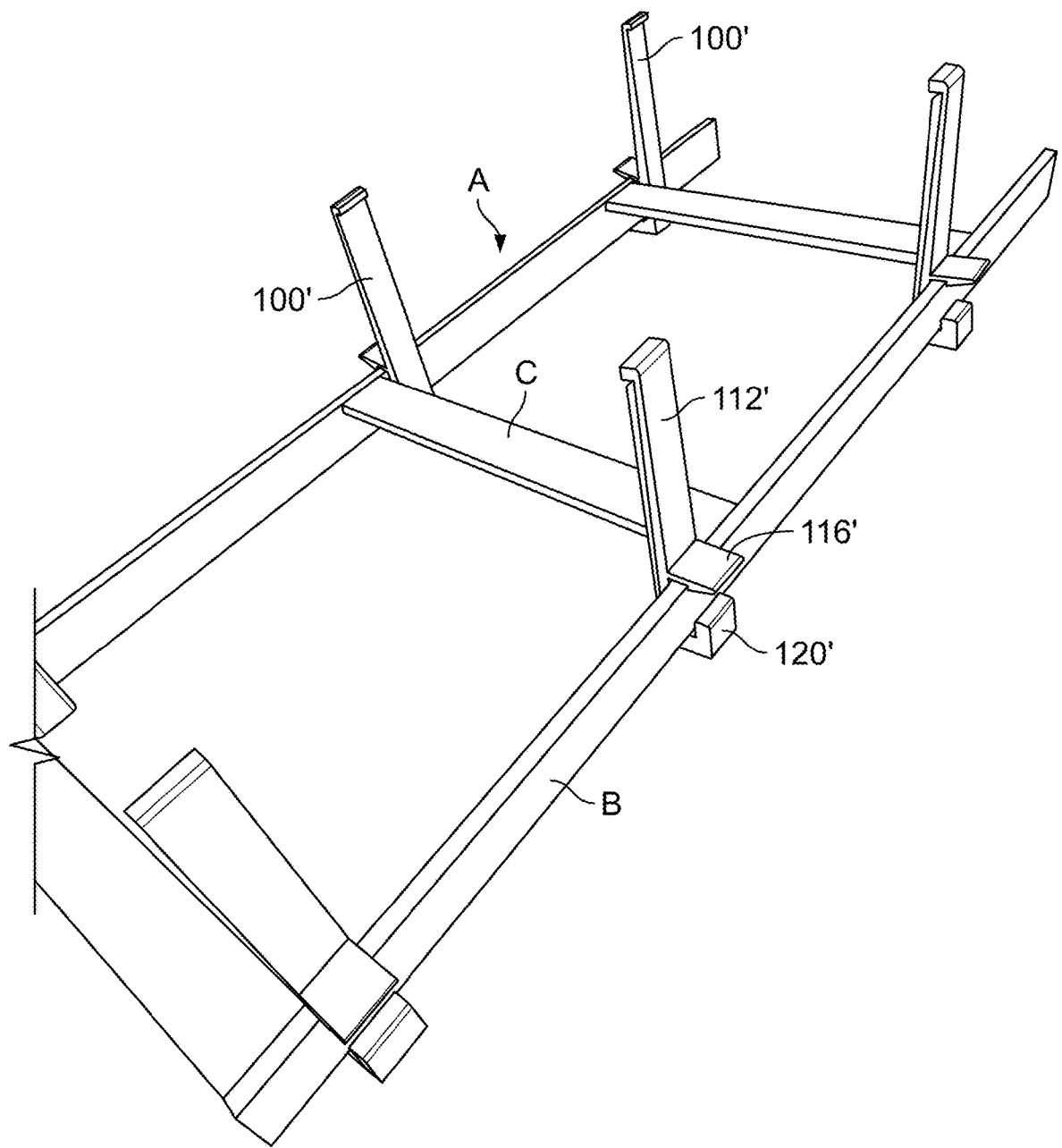
FIG. 10 depicts a plurality of data cable retaining posts mounted on a ladder rack system.

FIG. 10 depicts exemplary data cable retaining posts 100' fully installed on a prior art ladder A, complete with longitudinal main supports A and lateral minor supports B. In this case the data cable retaining posts are solid.

Figure 11:
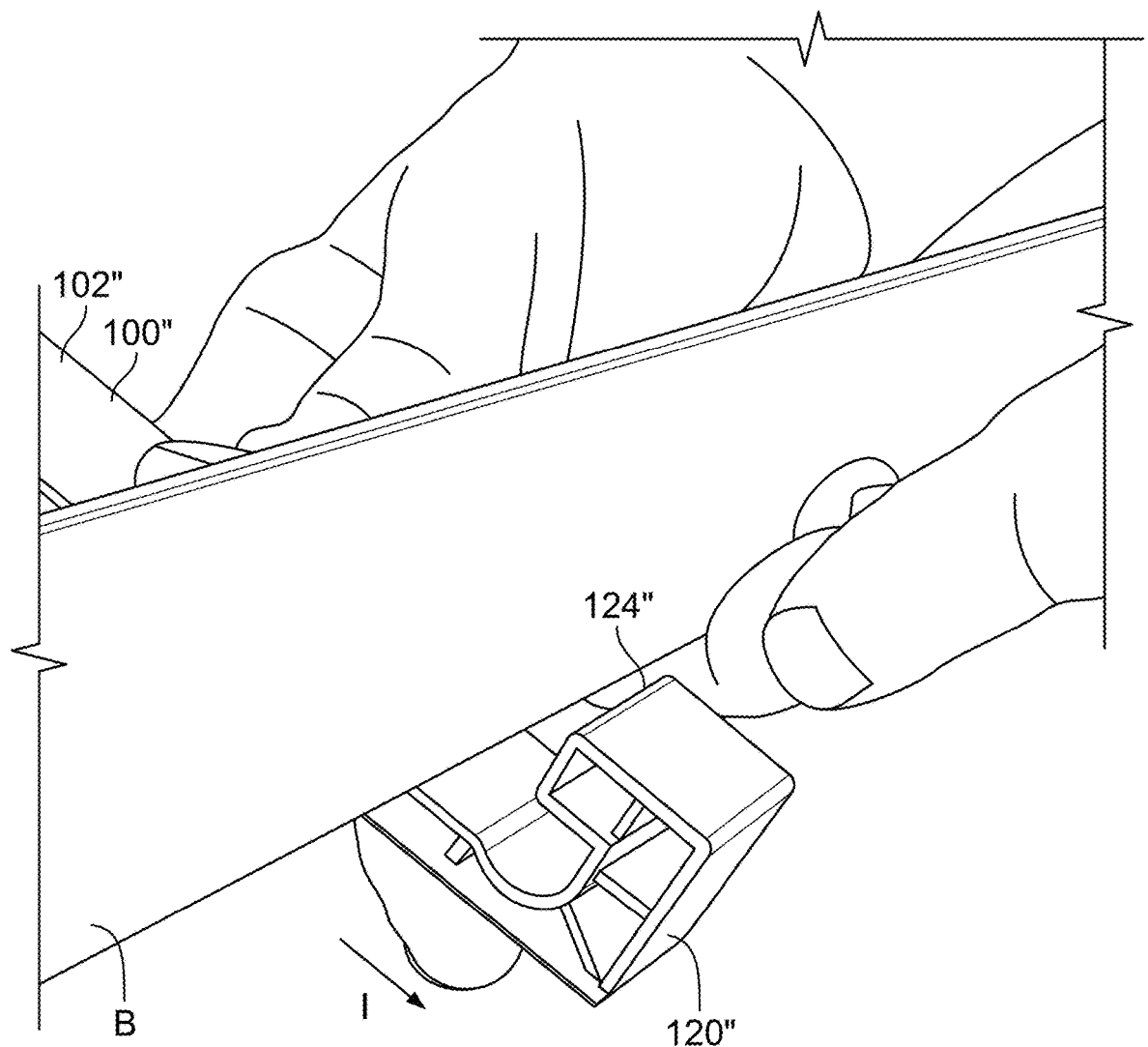
FIG. 11 is a perspective view showing one step in the method of installing a data cable retaining post.
Figure 12:
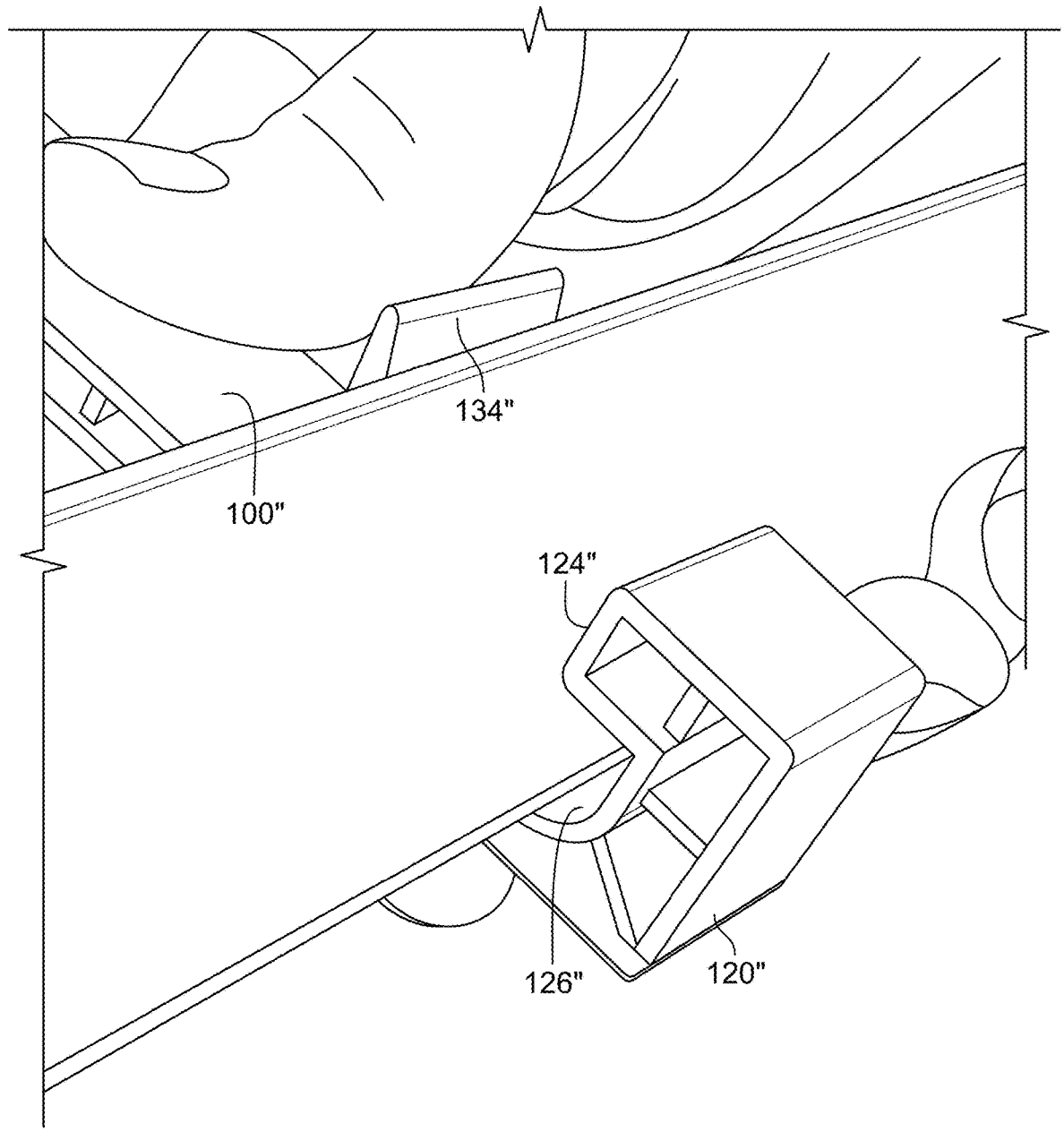
FIG. 12 is a perspective view showing another step in the method of installing a data cable retaining post.
Figure 13:
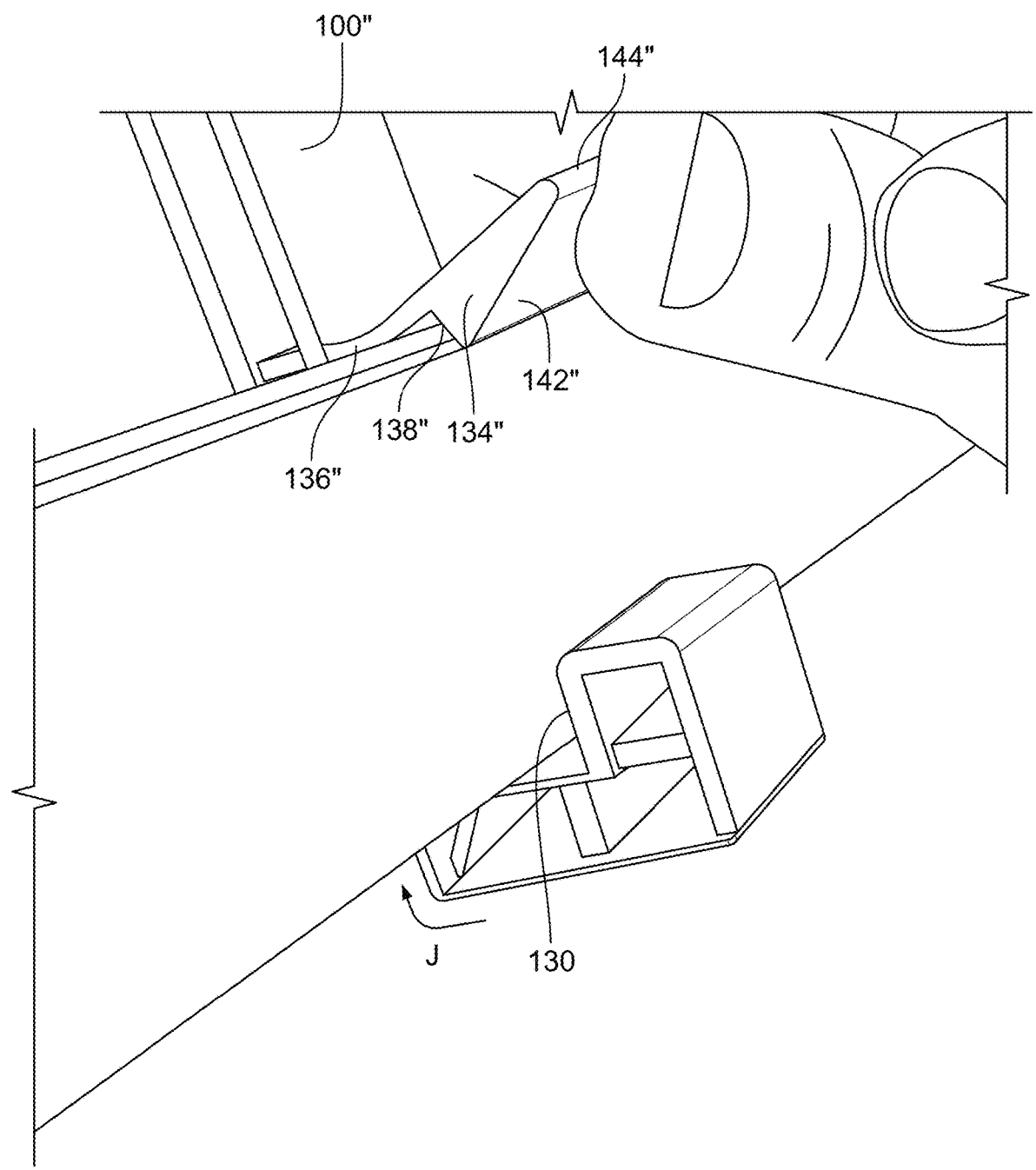
FIG. 13 is a perspective view showing a further step in the method of installing a data cable retaining post.
Figure 14:
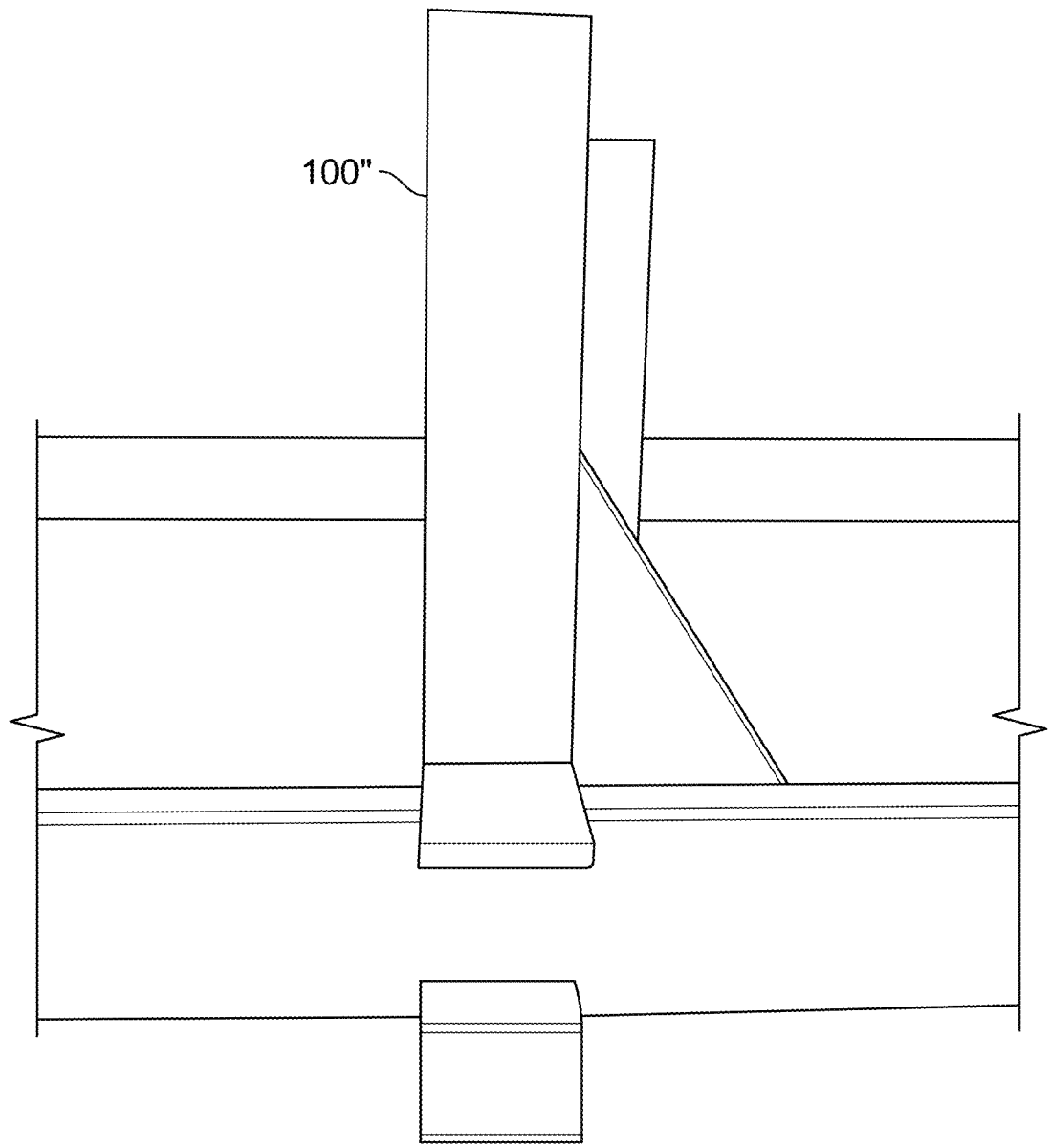
FIG. 14 depicts a rear view of one of the data cable retaining posts of FIG. 13.
Figure 15:
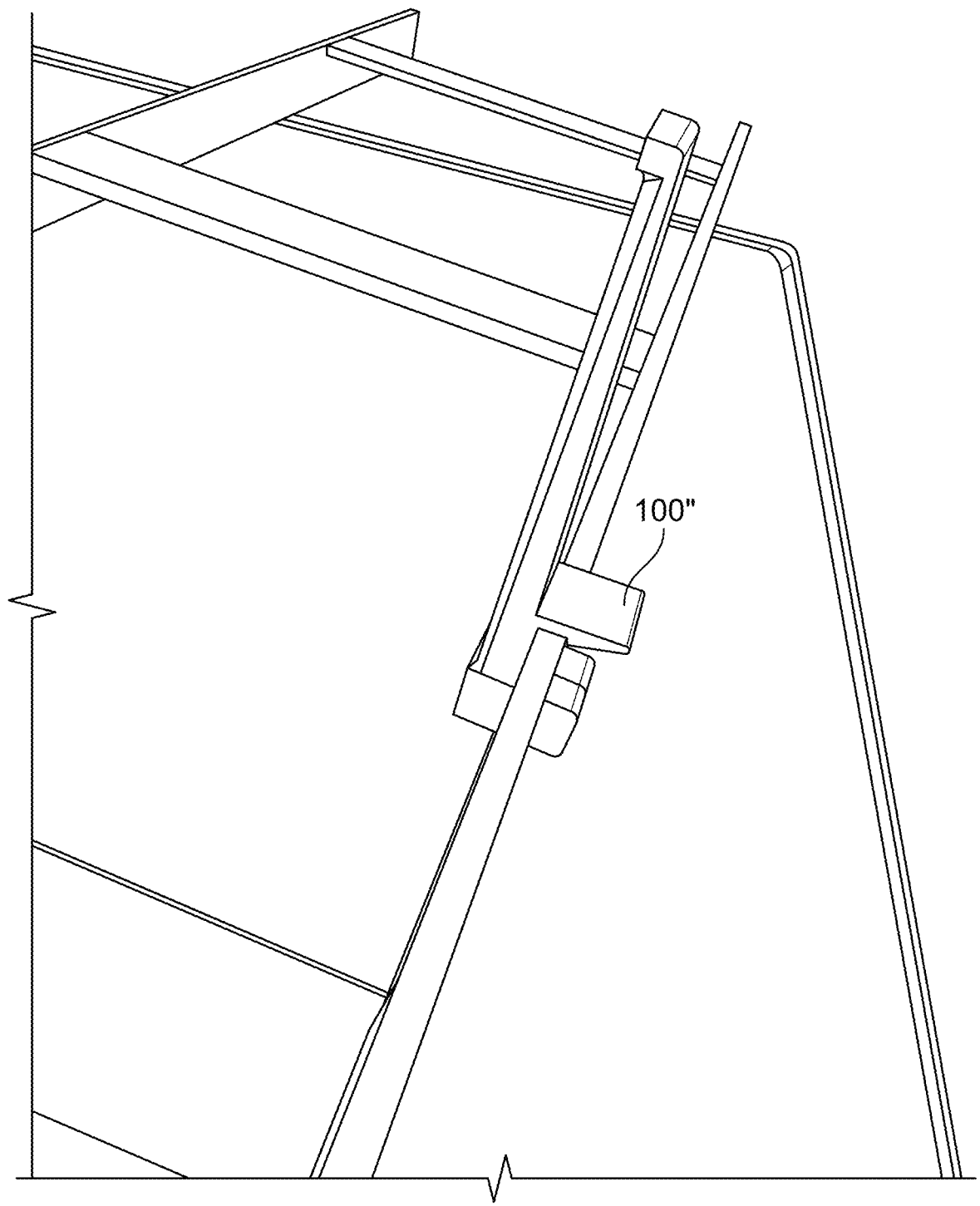
FIG. 15 depicts a side perspective view of one of the data cable retaining posts of FIG. 13.
Figure 16:
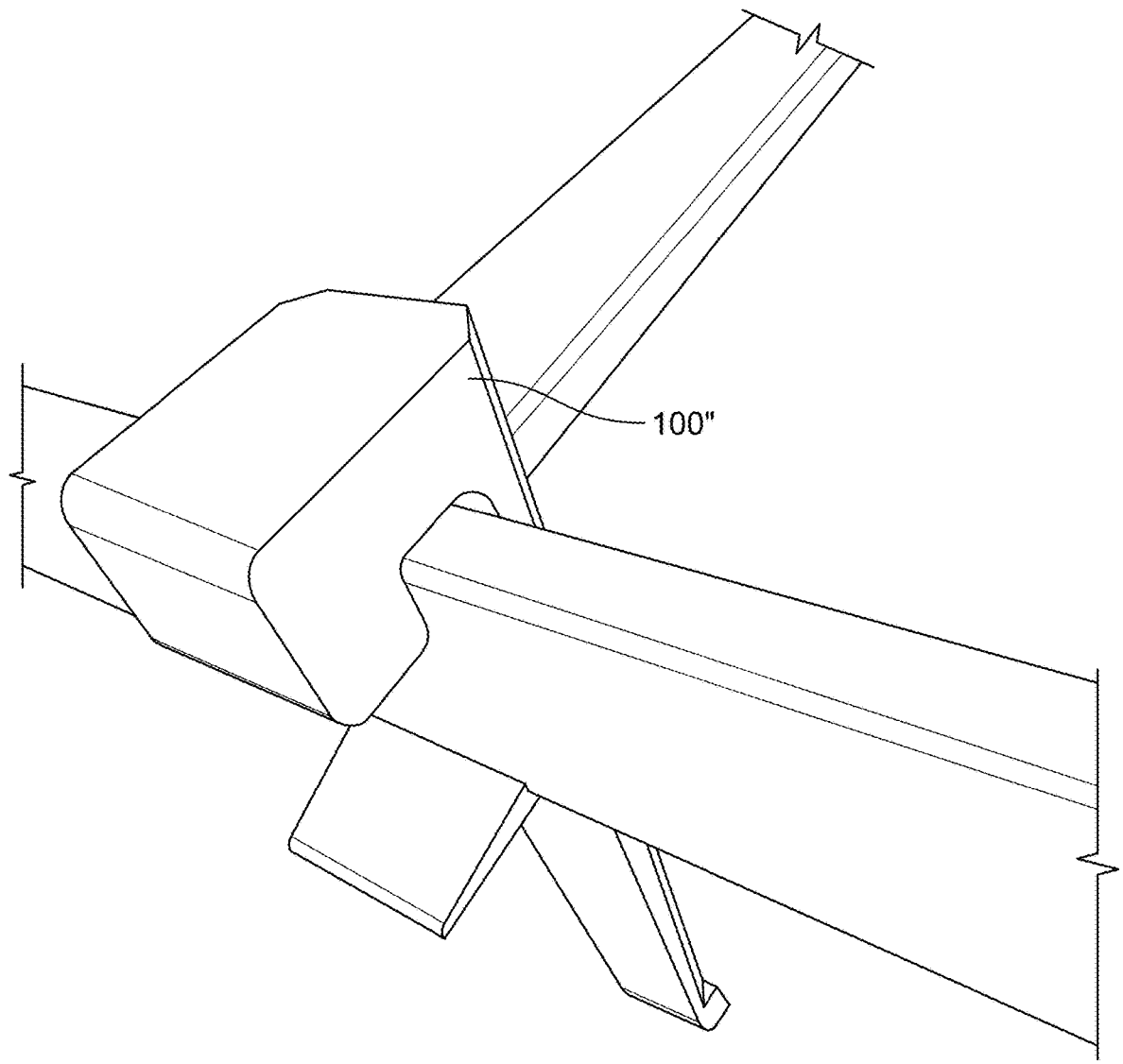
FIG. 16 depicts a bottom perspective view of one of the data cable retaining posts of FIG. 13.

FIGS. 11-13 detail one method of installing an inventive data cable retaining post 100', in this case a solid data cable retaining post absent a front plate, upon a prior art ladder A. Shown in FIGS. 11-13 is a single lateral main support B of such a ladder A. Starting at the inside of the ladder (i.e. the side directly adjacent to the lateral minor supports B), a data cable retaining post 100", in this case webbed with gussets and absent a front plate, may be dropped down from above along arrow I until the shoulder 124" of the hook member 120" clears the bottom of the lateral main support B, as shown in FIG. 11.

As shown in FIG. 12, the data cable retaining post 100" may then be moved such that the shoulder 124" contacts the bottom of the lateral main support B while the void 126" becomes partially filled with a corner of the lateral main support B. This provides an opportunity for the hook member 120" and the locking member 134" of the data cable retaining post 100" to sandwich the lateral main support.

As shown in FIG. 13, with the tip 144" of the locking member 134" clear of the lateral main support B, rotation of the data cable retaining post 100" along arrow J forces the ramp 142" of the locking member 134" to contact the lateral main support B, and cams the stem 136", which is resilient, to bend the stem temporarily until vertical edge 130" contacts the lateral main support. FIG. 12 shows how a user may also guide the locking member 134" upward to aid in the camming and bending process. Once the shoulder 138" of the locking member 134" clears the lateral main support B, the stem 136" is free to snap back to its non-deformed position such that the locking member 134" moves adjacent to the lateral main support B with the shoulder 138" and stem 136" directly adjacent to the lateral main support. This effectively locks the data cable retaining post 100" to the lateral main support B, as shown in FIGS. 10 and 14-16. In other words, the data cable retaining post cannot be removed from the lateral main support unless a user unlocks the locking member 134" by bending the stem 136" of the locking member 134" upward and away from the lateral main support, such that the shoulder 138" clears the lateral main support and the data cable retaining post can be rotated in a direction opposite that shown by arrow J.

It will be appreciated that, when it equipped with a front plate, this process faces the front surface of the front plate toward the inside of the ladder A, such that multiple data retaining posts will face each other and will serve to confine data cable laid on the lateral minor supports C of the ladder A. When not equipped with a front plate, the front surface of the connection member serves this function.

In either version, and because of the orientation of the installed data cable retaining post, the forces/energy from cables laid on the ladder rack will tend to push the data cable retaining post above the locking member outward, away from the ladder rack. This will tend to rotate the data cable retaining post as well. These forces are effectively counterbalanced by the hook member which secures the data cable retaining post to the bottom of the ladder rack lateral support member. Also aiding in this counterbalance is the locking member itself, situated at the top of the ladder rack lateral support member. It will be appreciated that the sandwiching of these two members is intended to be relatively tight, such that only minimal movement of the installed data cable retaining post is permitted. Should removing or repositioning of the data cable retaining post be desired, one would typically remove it in its entirety and reinstall it using the procedures outlined above.

As alluded to above, in other embodiments the data cable retaining post may be solid, without gussets or ribs. Data cable retaining posts such as these are shown in FIGS. 10, 14-16, and particularly in FIG. 17. In other embodiments, the data cable retaining posts may include ribs, but no gussets. An exemplary data cable retaining post such as this is shown in FIG. 18. It will also be appreciated that this embodiment does not include a separate front plate, but instead uses the front surface of the connection member to abut the data cable once installed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A data cable retaining post for retaining data cable laid along a ladder rack having a pair of longitudinal main supports, a first of the longitudinal main supports having an upper surface and a lower surface, said data cable retaining post comprising:
a front plate and a connection member;
said connection member having a lower portion forming a hook, a mid-portion forming a locking member, and an upper portion;
wherein when installed on the first of the longitudinal main supports of a ladder rack, said lower portion of said connection member is adapted to be positioned with said hook surrounding the lower surface of the longitudinal main support and said mid-portion is adapted to be positioned adjacent the upper surface of the longitudinal main support such that said locking member locks the data cable retaining post to the longitudinal main support, said data cable retaining post thereby confining data cable laid along the ladder rack between said mid-portion and said upper portion;
wherein said lower portion of said connection member comprises a shoulder having a vertical edge opposed to a rear surface of said connection member to form a void therebetween.

2. The data cable retaining post of claim 1, wherein said void includes a rounded edge along a portion of said rear surface of said connection member.

3. The data cable retaining post of claim 1, wherein said locking member comprises a stem and a triangular cam, said stem extending from a rear surface of said connection member.

4. The data cable retaining post of claim 3, wherein said triangular cam includes a cam shoulder forming a ramp extending to a tip of said triangular cam, said ramp forming a hypotenuse of said triangular cam.

5. The data cable retaining post of claim 4, wherein said stem is resilient.

6. The data cable retaining post of claim 5, wherein said connection member tapers smaller from said locking member to said upper portion.

7. The data cable retaining post of claim 1, wherein said locking member comprises a stem and a triangular cam;
wherein said triangular cam includes a cam shoulder forming a ramp extending from said cam shoulder to a tip, said ramp forming a hypotenuse of said triangular cam;
wherein said stem is resilient.

8. The data cable retaining post of claim 1, wherein said connection member is formed from ribs.

9. The data cable retaining post of claim 8, wherein said connection member includes gussets between said ribs.

10. A data cable retaining post, said data cable retaining post comprising:
a front surface and a rear surface;
a lower portion forming a hook, a mid-portion forming a locking member extending from said rear surface, and an upper portion;
said hook defining a shoulder having a vertical edge opposite said rear surface;
said locking member formed from a stem and a ramped cam;
wherein said rear surface defines a rounded void opposite said vertical edge of said shoulder.

11. The data cable retaining post of claim 10, wherein said stem is resilient.

12. The data cable retaining post of claim 11, wherein said rear surface tapers toward said front surface from said mid-portion to said upper portion.

13. The data cable retaining post of claim 11, further comprising ribs between said front surface and said rear surface.

14. The data cable retaining post of claim 13, further comprising gussets between said ribs.

15. The data cable retaining post of claim 11, further comprising a front plate defining said front surface.

16. A method of installing a data cable retaining post on a longitudinal main support of a ladder rack, wherein the data cable retaining post includes a front surface and a rear surface, a lower portion forming a hook with a void, and a mid-portion forming a locking member with a stem extending from said rear surface; said method comprising;
hooking said hook on a bottom portion of the longitudinal main support such that the bottom portion is situated in the void;
rotating the data cable retaining post such that the hook catches on the bottom portion of the longitudinal main support and the locking member contacts an upper portion of the longitudinal main support;
continuing to rotate the data cable retaining post to bend the stem;
continuing to rotate the data cable retaining post until the locking member locks on the longitudinal main support.

17. The method of claim 16, further comprising the step of manually bending the stem separate from said step of continuing to rotate the data cable retaining post.

18. A data cable retaining post for retaining data cable laid along a ladder rack having a pair of longitudinal main supports, a first of the longitudinal main supports having an upper surface and a lower surface, said data cable retaining post comprising:
a front plate and a connection member;
said connection member having a lower portion forming a hook, a mid-portion forming a locking member, and an upper portion;
wherein when installed on the first of the longitudinal main supports of a ladder rack, said lower portion of said connection member is adapted to be positioned with said hook surrounding the lower surface of the longitudinal main support and said mid-portion is adapted to be positioned adjacent the upper surface of the longitudinal main support such that said locking member locks the data cable retaining post to the longitudinal main support, said data cable retaining post thereby confining data cable laid along the ladder rack between said mid-portion and said upper portion;

wherein said connection member is formed from ribs;

wherein said connection member includes gussets between said ribs.

* * * * *